United States Patent Office 3,210,893
Patented Oct. 12, 1965

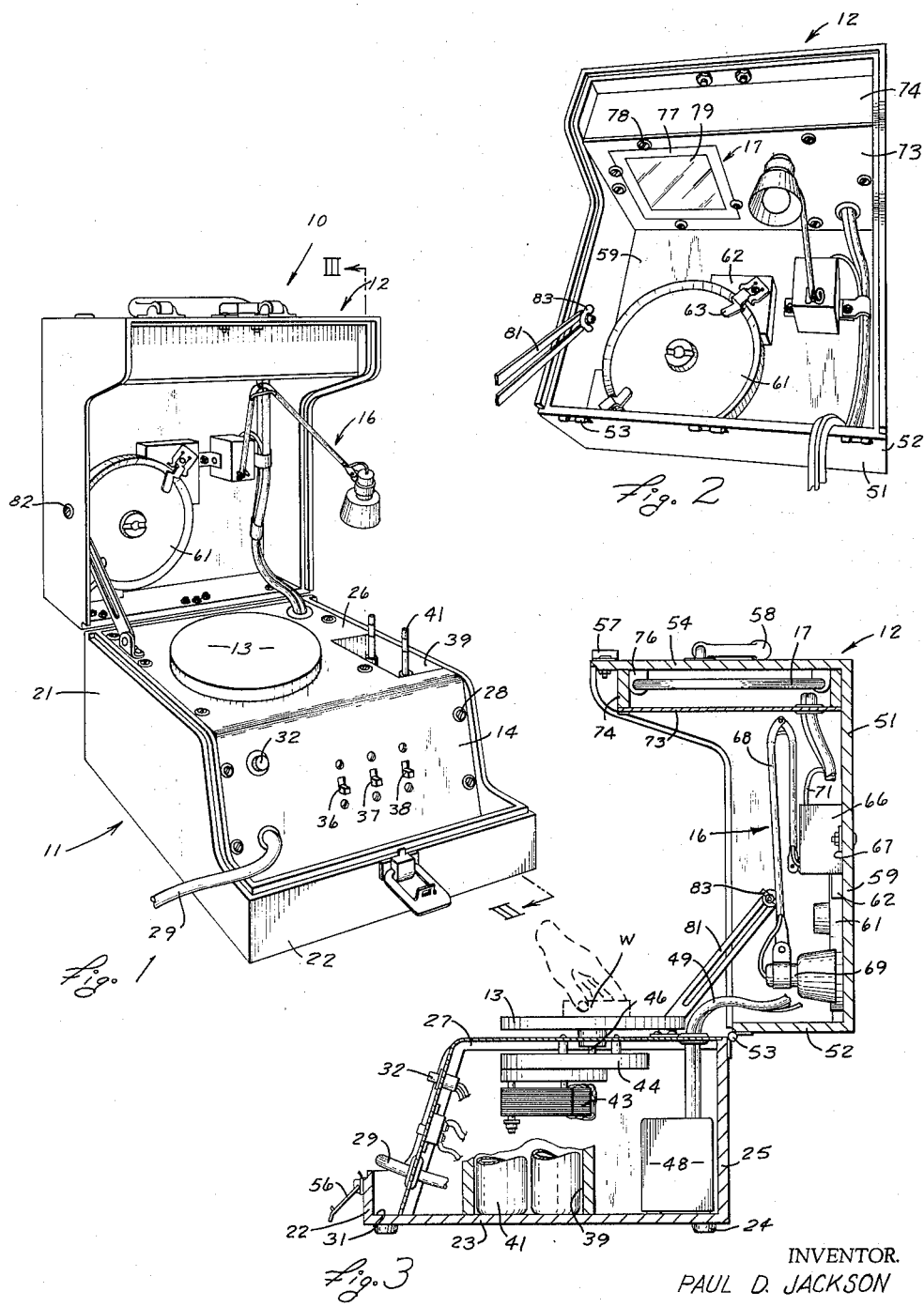

3,210,893
LAPPING TOOL
Paul D. Jackson, Comstock Township, Kalamazoo County, Mich., assignor to Durametallic Corporation, Kalamazoo, Mich., a corporation of Michigan
Filed Sept. 16, 1963, Ser. No. 309,205
5 Claims. (Cl. 51—170)

This invention relates to a lapping tool and more specifically it relates to a portable, encased lapping tool particularly adapted to lapping the seal elements for rotating shaft seals and the like.

The present invention arose from a long-standing need in the fluid seal industry for a self-contained apparatus capable of renewing the seal surfaces of fluid sealing elements under field conditions.

Fluid seals of the type shown in Patent No. 2,306,417, and many other patents, are used in large numbers in a wide variety of applications. Such seals typically contain a ring of one material (often carbon, and referred to hereinafter for convenient reference as carbon) located adjacent and coaxial with a ring of another material, such as hardened steel, or stellite surfaced steel, having a radial face in contact with the adjacent radial face of said first-named ring for defining a sealing interface. The effectiveness of this sealing interface is generally gradually lost in use due to the entrance of foreign particles thereinto or due to fractional degradation of the sealing surfaces whereby grooves or other irregularities form on the sealing faces. Eventually, therefore, the seal must be repaired.

It has been the practice for the past quarter century, at least insofaras the assignee of the present invention is aware, for the hardened ring to be removed from the machine and shipped to the manufacturer who would then cause the ring to be lapped to restore the sealing face thereof. Thereafter, the ring was return-shipped to the machine site and reinstalled upon the machine before operation of said machine could be resumed. During the time during which the ring was at the factory, said machine was inoperative unless a replacement ring was at hand. Thus, unless a considerable stock of spare seal rings was maintained, a given machine could be inoperative for an extended period of time, such as a week or more, and the loss of machine time over a given period was often great.

Although the above-described practice has long been regarded as needing improvement, previous alternatives have themselves had disadvantages sufficiently serious as to preclude their widespread use. It has been found, for example, that the operativeness of a repaired seal can be relied upon as adequate only if new hardened elements and matched new carbon elements are used or if a new carbon element is used with an adequately refaced hardened element.

Local stocking of the required new or resurfaced hardened elements by either the user or the manufacturer's local representative is generally too costly and inconvenient for the user who may have a large number of seals of differing sizes and characteristics and is generally too costly and inconvenient for the local representative who may service annually just a few of any given kind and size of an even wider variety of seal types. Hence, it is practical to stock such hardened rings for all seal types only in a few limited places and usually only at the plant of the manufacturer involved. Under this situation, which is the existing situation, repair of a faulty seal has heretofore required factory resurfacing of the faulty seal element or the obtaining of a new or used but resurfaced element from the manufacturer. In some instances, a large user may have facilities for lapping seal elements at a central repair shop but this also is time consuming and results in substantial loss of machine time.

This situation often requires that the seal manufacturer's local representative visit the machine site on at least two separate occasions to repair a single faulty seal assembly. The first visit is typically a diagnostic one wherein the representative may often require a complete disassembly of the seal assembly to determine the fault. Oftentimes, the fault involves a defective seal face on the hardened element and during the period required for the delivery of such a seal element from the manufacturer the machine may be idle. In other cases the machine is reassembled with a later consequent disassembly for replacement of the defective seal element and second reassembly. Further, even if the diagnosis of the problem does not require the tearing down of the machine, said machine may be forced to remain inoperative because of the faulty seal until the arrival of the new seal element from the manufacturer.

The device of the present invention was developed out of the needs of the abovementioned situation and the objects of this invention include:

(1) To provide a seal element lapping tool particularly adapted to renewing the hardened faces on steel or the like seal elements under field conditions and near the site of the machine of which the seal element is a part.

(2) To provide a lapping tool, as aforesaid, including in a single compact and portable assembly all means normally required for renewing the hardened seal face of hardened seal elements.

(3) To provide a lapping tool, as aforesaid, capable of being manually carried by a service representative to a machine site, requiring only commonly available external power connections, being independent of environmental lighting, being capable of operation by existing service personnel with little or no added instruction, and providing means for checking the quality of the sealing face of the seal element being renewed at any time during the renewal process.

(4) To provide a lapping tool, as aforesaid, which is relatively inexpensive to manufacture, which utilizes readily available or easily constructed parts, which is strongly constructed for a long service life with a minimum of maintenance and which is easily maintained.

Other objects and purposes of this invention will be apparent to persons acquainted with devices of this type upon reading the following specification and inspection of the accompanying darwings.

In the drawings:
FIGURE 1 is a perspective view of the lapping tool embodying the invention in its operative condition.
FIGURE 2 is a perspective view of the cover portion of the lapping tool in FIGURE 1.
FIGURE 3. The terms "upwardly," "downwardly," view of the lapping tool of FIGURE 1 with the rightward side thereof removed.

The following disclosure utilizes certain terminology for purposes of convenience in reference only, such terminology not being believed or intended to be limiting. For example, the terms "forwardly" and "rearwardly" will refer respectively to directions of the left and right in FIGURE 3. The terms "upwardly," "downwardly," "rightwardly" and "leftwardly" will refer to specific ones of the drawings. The terms "inwardly" and "outwardly" will refer to directions, respectively, toward and away from the geometric center of the device of the invention. Such terminology will include the terms above specifically mentioned, derivatives thereof and words of similiar import.

Referring now to FIGURES 1 and 2, a lapping tool 10 is disclosed having a base portion 11 and a cover portion 12. The base portion 11 includes a rotatably mounted lapping wheel 13 and a control panel 14. The cover portion 12 includes an adjustable lamp 16 for providing working illumination and a monochromatic light source 17.

Turning more specifically now to the base portion 11, same comprises an upwardly opening, rectilinear box 21, the front end 22 of which is of substantially lower height than the side and rear end thereof and the front edges of the sides of the box 21 being sloped smoothly downwardly to meet the upper edge of said front end 22. The box 21 has a bottom 23 (FIGURE 3) having a plurality, here four, of resilient feet 24 affixed thereto. The top of the box 21 is covered by a rigid sheet 26 extending from the rear end of said box forwardly until it meets and is preferably integral with the sloping control panel 14 which slopes downwardly and forwardly therefrom, and which lies just within the sloping forward edges of the sides of the box 21. The sheet 26 is affixed to suitable blocks 27 (FIGURE 3) by screws 28 (FIGURE 1) which blocks 27 are fixed to sides of said box. The distance between the control panel 14 and the front end wall 22 is sufficient to define a compartment 31 for purposes disclosed hereinafter.

The base portion 11 further includes a recessed portion 39 in the sheet 26 for reception thereinto and storage therewithin of suitable containers 41 of lapping compound or the like. An electric motor 43 of any convenient type is mounted on the underside of the sheet 26 within the base portion 11 (FIGURE 3) and has a suitable gear box 44 thereon, the output shaft 46 of which engages and rotatably supports the underside of the wheel 13, for rotating said wheel at a suitable speed. The wheel 13 is preferably diamond faced with diamond particles being arranged in a spiral pattern, not shown, in a conventional manner. Finally, the base portion 11 has affixed therewithin a suitable electrical ballast 48 of any convenient type for the monochromatic lamp 17.

The cover portion 12 comprises a relatively shallow rectilinear box 51 hingedly connected on its rear end wall 52 with the rear end wall 25 of the base portion 11 by a plurality of hinges 53 of any preferred type. The box 51 has an extended forward end wall 54 and sidewalls whose free edges are opposite in shape and correspond to the free edges of the sides and forward end wall 22 of the bottom portion 11 so that when the cover portion 12 is rotated downwardly and forwardly about the hinges 53, the downwardly facing edges of said cover portion 12 will contact and be substantially contiguous with the corresponding upwardly facing edges of the base portion 11. A hasp 56 is provided on the forward end wall 22 of the base portion 11 for engaging a hasp block 57 on the lower part of the forward end wall 54 of the cover portion 12 whereby to maintain the lapping tool 10 in a closed position. A carrying handle 58 is provided on said forward end wall 54 to assist in the opening of the cover portion 12 and when the lapping tool 10 is in its closed position to enable it to be more easily carried.

The top wall 59 of the cover portion 12 carries a spare lapping wheel 61 which may be of the same grit as the wheel 13 or which may be finer or coarser as desired. Contoured blocks 62 prevent movement of the spare wheel 61 along the top wall 59 and each has a spring clip 63 resiliently and releasably biasing the spare wheel 61 to remain in contact with said top wall 59.

The adjustable lamp 16 here shown comprises a mounting box 66 which is affixed to the inner surface of the top wall 59 of the cover portion 12 by any convenient means such as the brackets 67. In the particular embodiment shown here, the lamp 16 also includes an articulated lamp head supporting linkage 68 supporting a reflectorized socket 69 into which is inserted a conventional light bulb. The adjustable lamp 16 is so constructed as to be foldable close to the top wall 59 of the cover portion 12 whereby said cover portion 12 may be closed against the base portion 11 of the lapping tool 10 without damage to any part thereof including the lamp 16. The lamp 16 also may be moved outwardly from the cover portion 12 when said cover portion is open as seen in FIGURES 1 and 2 whereby to illuminate the working area of the sheet 26 including the wheel 13.

The cover portion 12 further includes a bulkhead 73 lying parallel to and spaced from the forward end wall 54 thereof and supported upon suitable risers 74 attached to said forward end wall 54. Suitable brackets 76 support the monochromatic light source 17 upon the forward end wall 54 of the cover portion 12. A suitable window including a frame 77 is affixed to the bulkhead 73 by means such as screws 78 and supports a window panel 79 which is preferably transparent to the light generated by the monochromatic lamp 17. The window panel 79 is preferably located on the bulkhead 73 such that when the cover portion 12 is in its open condition of FIGURE 1, said light will be above and slightly to the rear of the wheel 13.

An elongated slotted guide 81 is hinged at the lower end thereof to the base portion 11 and the slot thereof rides upon a suitable screw 82 on the inner face of a side wall of the cover portion 12 whereby the cover portion 12 is prevented from being opened past the open position of FIGURE 1 by the bearing of said screw 82 against said slotted guide 81. A wing nut 83 is provided on the screw 82 to assure that the cover portion 12 will remain open while the machine is being used.

A power cord 29 emerges from the control panel 14 and is normally connected to a suitable source of voltage such as 110 volts A.C. The power line 29 connects internally of the base portion 11 through an externally accessible fuse holder 32 (FIGURES 1 and 3) which is normally equipped with a suitable fuse, not shown, for preventing overloading of the internal wiring of the tool 10. From the fuse holder 32 the incoming power preferably goes to separate circuits feeding the motor 43, the ballast 48 for the monochromatic light 17 and the adjustable lamp 16 through respective switches 36, 37 and 38 on the control panel 14. The ballast 48 feeds the monochromatic lamp 17 through the cable 49 and the adjustable lamp 16 is fed by the switch 38 through the cable 71. Other cables, not shown, connect the switch 36 to the motor 43 and the switch 37 to the ballast 49 to complete the wiring.

*Operation*

Although the operation of the device of the invention has been indicated somewhat above, same will be given in detail hereinbelow for purposes of assuring a clear understanding.

Upon being transported, usually manually, to a point of operation, which may be adjacent the machine having a defective seal element, the lapping tool 10 is opened by releasing the hasp 56 and opening the cover portion 12 to its position of FIGURE 3 whereafter the wing nut 83 is tightened to assure the maintenance of said cover portion 12 in an open position. The power cord 29 is then removed from the compartment 31 for plugging same into a convenient local source of power.

Upon plugging in the power cord 29, the desired one of the wheels 61 and 13 may be selected for being driven by the motor 43. Thereafter, if needed, lapping compound from one of the containers 41 may be put upon the wheel to be driven, here the wheel 13, and the switch 36 may be activated to apply voltage to the motor 43 whereby to rotate the wheel 13. The lamp 16 is adjusted from its closed position of FIGURE 3 to its operative positions of FIGURES 1 and 2 and the switch 38 may be activated to turn same on. The switch 37 is activated to turn on the monochromatic light 17. The workpiece indicated dottedly at W in FIGURE 3 then has its sealing face applied to the lapping wheel 13 in a conventional manner. The workpiece W is generally held in the operator's hand during lapping. After a desired period of resurfacing by the wheel 13, the workpiece W may be moved from said wheel 13 and inspected under the light of the monochromatic lamp 17 in a known manner to determine the extent to which the sealing surface of the workpiece has been restored. The workpiece W is further lapped to the extent required, the flatness thereof being indicated by the monochromatic lamp 17. After lapping is completed, the workpiece W may be immediately returned to its sealing assembly on the machine and the lapping tool 10 may be shut off by shutting off the switches 36, 37 and 38 to respectively turn off the wheel 13, the monochromatic lamp 17 and the adjustable lamp 16. The power cord 29 may then be removed from the local source of power and be replaced in the compartment 31, the lamp 16 may be returned to its closed position of FIGURE 3 and the containers 41 may be returned to the recess 39. The upper portion 12 may then be rotated on the hinges particularly downwardly and into contact with the upper surfaces of the body portion 11 of the lapping tool 10 whereafter the hasp 56 may be actuated to maintain the lapping tool in a closed position.

Although a particular preferred embodiment of the invention has been disclosed hereinabove for purposes of illustration, modifications or variations thereof appearing in the appended claims are fully contemplated.

What is claimed is:

1. In a lapping tool for lapping the surface of a workpiece, the combination comprising:
   a box having a hinged cover, motor means fixed to said box and a rotatable lapping wheel rotatably supported and driven by said motor means below said cover;
   a monochromatic light source and means supporting same on an inner surface of said cover whereby when said cover is in an open condition, said monochromatic light source is spaced above and rearwardly of said lapping wheel for illuminating said wheel and a workpiece closely adjacent thereto for detecting flaws in the lapped surface of the workpiece; and
   means for supplying electrical power to said motor means and said monochromatic light source.

2. The lapping tool defined in claim 1 including an illuminating lamp on an elongated flexible arm fixed to one of said cover and said box and connected to said power supplying means whereby when said cover is open, said illuminating lamp may be energized to provide general illumination in an area around and including said lapping tool.

3. In a lapping tool for lapping a workpiece, the combination comprising:
   a box;
   motor means fixed to said box and a lapping wheel located on top of said box rotatably supported and driven by said motor means;
   a cover having one edge hinged to said box for pivotal motion away from said box to an open position for exposing said wheel and toward said box to a closed position thereagainst to form a closed container for enclosing said wheel;
   a working illumination lamp enclosable within said container and means for mounting same on said cover;
   a monochromatic lamp mounted on and within said cover in a position opposed to and spaced from said one edge and located substantially above said wheel when said cover is open to allow the surface condition of the workpiece to be checked;
   electrical conductor means for connecting said motor means, illumination lamp and monochromatic lamp to a source of electrical power, said conductor means including switch means arranged for energizing at least said illumination and monochromatic lamps independently of each other.

4. The device defined in claim 3 in which said electrical conductor means include a cable;
   said box includes storage compartments for said cable and for lapping compound; and said cover includes means for locating and storing a spare lapping wheel.

5. In a lapping tool, the combination comprising:
   a base portion defined by a first essentially rectilinear box having a rear wall, a relatively low forward wall and side walls having upper edges with segments which slope downwardly adjacent said forward wall;
   sheet means connecting said side walls adjacent said upper edges thereof from said rear wall of said first box to and along said downwardly sloping segments of said upper edges on said side walls, the portion of said sheet means extending along said downwardly sloping segments comprising a control panel;
   an open topped compartment between said control panel and said forward wall;
   a flat circular lapping wheel having an abrasive upper face;
   motor means mounted on and below said sheet means and rotatably supporting and driving said lapping wheel;
   a recess in said sheet means and lapping compound containers insertable therein for storage therewith;
   a cover portion generally defined by a second rectilinear box having an open bottom face, a rearward wall, an elongated forward wall, a top wall and side walls having elongated forward ends, said forward wall and side walls of said second box having contours along their lower edges corresponding to the contours of the upper edges of said forward and side walls on said first box whereby when said cover portion is placed in its closed position upon said base portion a completely closed rectilinear object is formed;
   hinge means hingedly connecting said cover portion to said base portion along the corresponding edges of their rearward walls;
   illumination light means secured to the lower surface of the top wall of said cover portion for providing working illumination when said lapping tool is in operation;
   a generally planar bulkhead and means supporting same parallel to and spaced inwardly from the forward wall of said cover portion;
   a monochromatic light source supported on said bulkhead and window means in said bulkhead for allowing the light of said monochromatic light source to fall upon said lapping wheel when said cover portion is in an open position;
   electrical ballast means for said monochromatic light source fixed within said base portion;
   a power cable connectible to a power source at an end thereof and exiting from said lapping tool through said control panel and foldable into said compartment for storage therein when said lapping tool is idle and said cover portion is engaged with said base portion in a closed position;
   switch means on said control panel for connecting said motor means, said illumination light means and said monochromatic light source to said power cable.

References Cited by the Examiner
UNITED STATES PATENTS

| | | | |
|---|---|---|---|
| 1,189,592 | 7/16 | Lutz. | |
| 1,591,473 | 7/26 | De Vivo | 51—168 |
| 2,762,172 | 9/56 | Franklin | 51—134.5 |
| 3,089,259 | 5/63 | Miller | 274—2 X |

OTHER REFERENCES

"Measuring Flatness with Lapmaster Monochromatic Light and Optical Flats," by Crane Packing Company.

LESTER M. SWINGLE, *Primary Examiner*.

J. SPENCER OVERHOLSER, *Examiner*.